Nov. 1, 1966  E. STIFT  3,283,166

AUTOMOTIVE SAFETY UNITS

Filed July 25, 1962  3 Sheets-Sheet 1

INVENTOR
EDWARD STIFT
BY Cohn and Powell
ATTORNEYS

Nov. 1, 1966     E. STIFT     3,283,166
AUTOMOTIVE SAFETY UNITS
Filed July 25, 1962                                3 Sheets-Sheet 2
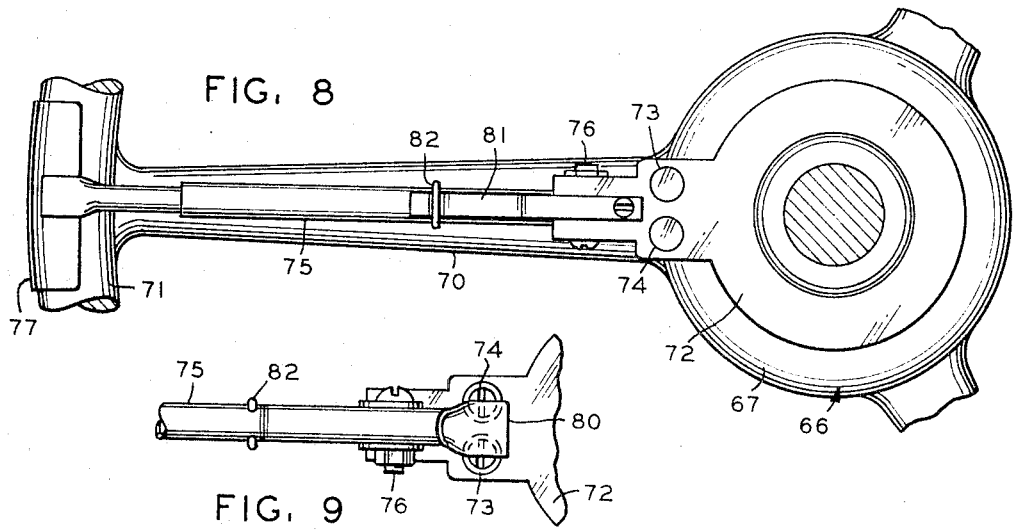
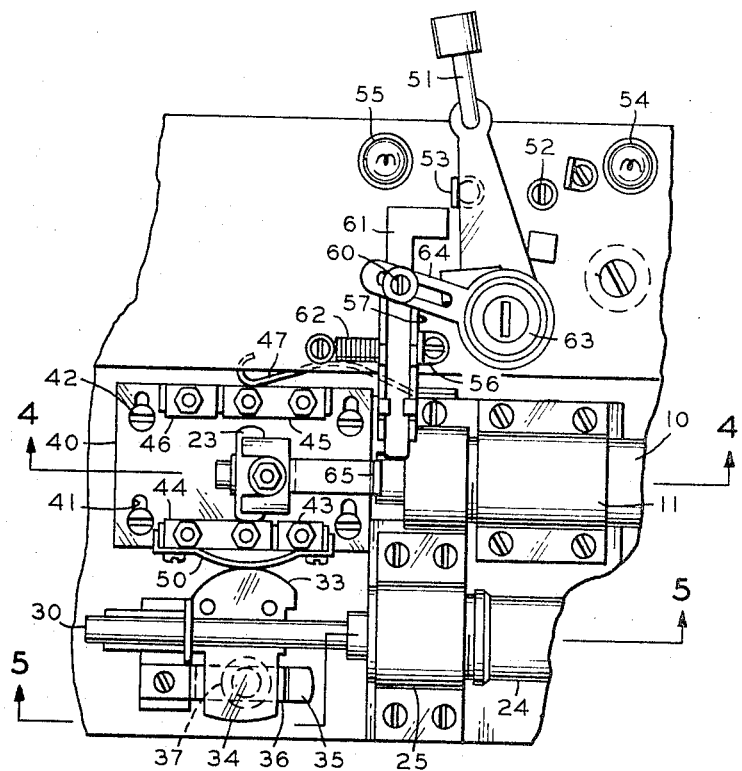
INVENTOR
EDWARD STIFT
BY Cohn and Powell
ATTORNEYS Nov. 1, 1966  E. STIFT  3,283,166

AUTOMOTIVE SAFETY UNITS

Filed July 25, 1962

INVENTOR
EDWARD STIFT
BY Cohn and Powell
ATTORNEYS

United States Patent Office 3,283,166
Patented Nov. 1, 1966

3,283,166
AUTOMOTIVE SAFETY UNITS
Edward Stift, 7510 S. Lindbergh Blvd., St. Louis, Mo.
Filed July 25, 1962, Ser. No. 212,234
12 Claims. (Cl. 307—10)

This invention relates generally to improvements in automotive safety units, and more patricularly to an improved system and mechanism for operating a vehicle such as an automobile, truck or bus whereby the vehicle is automatically stopped upon existence of certain potentially hazardous conditions.

An important objective is achieved by the provision of a safety unit that stops the vehicle when a steering wheel switch or other manual switch is released, as would occur if the driver became unconscious because of illness. This unit is specially valuable and advantageous where the driver collapses or dies while driving as a result of a heart attack or other disabilitating physical condition.

Another important object is realized by the structural arrangement of a pressure-responsive means connected to the oil pump and including a movable contact in an electrical circuit, and a switch means selectively connecting the movable contact to the distributor when a manual switch is held closed or to a brake-actuating means when the manual switch is opened and the distributor is operatively disconnected.

Still another important objective is afforded by the construction of the main switch so that the pressure-responsive movable contact will engage a first contact during a low speed range to enable normal driving operation whether or not the manual switch is closed, will engage a second contact connected to the distributor through the manual switch during all speeds above a predetermined limit, and will automatically engage a third contact connected to the brake-actuating means in order to halt the vehicle when the manual switch is opened.

An important object is realized by constructing the main switch so that it is shiftable between limits to cause operative engagement of the reciprocatively movable, pressure-responsive contact with either the first and second contacts at one side or with the third contact at the opposite side to obtain the aforementioned functional advantages.

Another important objective is achieved by the provision of an improved manual switch adapted to be utilized with the steering wheel, the switch including a swingable arm that can be conveniently gripped with the wheel rim and can be swiveled relative to the wheel hub so that effective closed-circuit position can be maintained under normal driving usage of the steering wheel, yet is automatically swingable away from the wheel rim to an open-circuit position when released.

Yet another important objective is provided by an improved ignition cut-off unit that includes a switch operatively connected to the distributor and selectively actuated by a pressure-responsive means connected to the oil pump above a predetermined speed to disconnect the distributor. The cut-off switch has a contact with an arm selectively movable into the path of a stop element carried by the reciprocative piston of the pressure-responsive means, the stop element engaging the arm and opening the switch when the piston is extended a distance responsive to oil pump pressure corresponding to a predetermined limit speed, and hence stopping the vehicle motor.

It is an important objective to provide an automotive safety unit and system that is simple and durable in construction, economical to manufacture and assemble, highly efficient and effective in operation, and capable of ready installation in new and used vehicles either as standard or accessory equipment.

The foregoing and numerous other objects and advantages of the invention will more clearly appear from the following detailed description of a preferred embodiment, particularly when considered in connection with the accompanying drawings, in which:

FIG. 3 is a fragmentary front elevational view, similar to FIG. 2, but showing the pistons of the pressure-responsive means extended;

FIG. 8 is a rear elevational view of the mechanism shown in FIG. 7;

FIG. 9 is a fragmentary view as seen along line 9—9 of FIG. 7, and

Figure 2:
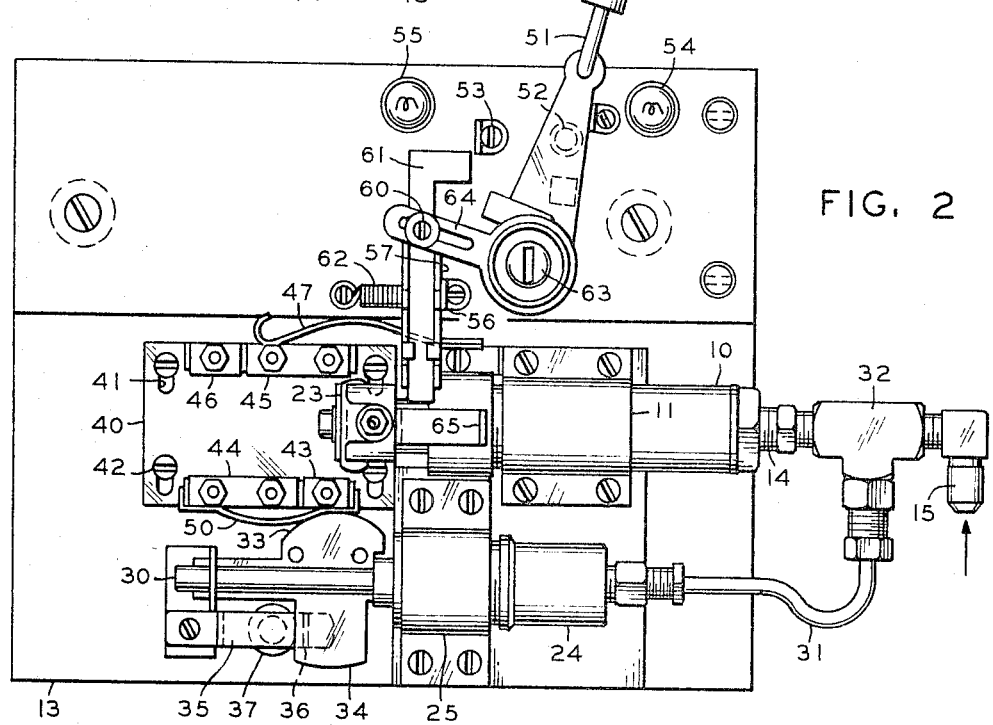
FIG. 2 is a front elevational view of the safety unit showing both pistons of the pressure-responsive means retracted.
Figure 4:
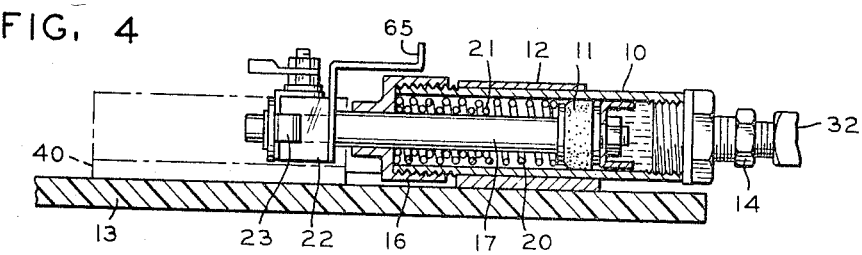
FIG. 4 is a cross-sectional view as seen along line 4—4 of FIG. 3.
Figure 5:
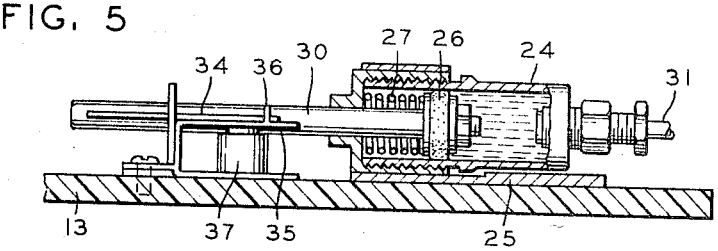
FIG. 5 is a cross sectional view as seen along staggered line 5—5 of FIG. 3.

Referring now by characters of reference to the drawings, and first to FIG. 4, it is seen that a pressure-responsive means is operatively connected to an oil pump (not shown) of the automotive system. This pressure-responsive means includes a first cylinder 10 receiving a reciprocative piston 11. A bracket strap 12 mounts the cylinder 10 onto panel 13. Attached to one end and communicating with the interior of cylinder 10 is a check valve 14. As is best seen in FIG. 2 a conduit 15 operatively interconnects the check valve 14 with the oil pump.

The opposite end of cylinder 10 is provided with a fitting 16 through which the piston rod 17 slidably extends. Disposed around the piston rod 17 are a pair of compression springs 20 and 21 that tend to urge the piston 11 in a direction toward its fully retracted position as is illustrated in FIG. 4. Specifically, the shorter spring 21 does not effectively act on the piston 11 until the piston has been extended a predetermined distance, at which time the compressive forces of the springs 20 and 21 combine to resist the oil pressure exerted on the other side of the piston 11.

The outermost end of the piston rod 17 is provided with an enlarged head portion 22 to which is fastened a contact 23 that extends about the head portion 22 on each side. It will be noted that the contact 23 moves reciprocatively in a defined path with the piston 11 in response to variations in oil pressure that correspond in turn to variations in speed of the vehicle.

As will be apparent later, oil will flow through the conduit 15, pass the check valve 14 and into the first cylinder 10 to act on the piston 11 in order to extend the piston rod 17 and hence move the contact 23 to an extended position. However, when oil pressure is decreased or relieved entirely, the oil in the first cylinder will leak slowly past the check valve 14 under the compressive action of the springs 20 and 21. This action causes the piston switch 23 to move slowly from its extended position to its retracted position.

Located immediately adjacent the first cylinder 10 is a second cylinder 24 that is attached to panel 13 by a bracket strap 25. Reciprocatively mounted within the second cylinder 24 is a second piston 26. A compression spring 27 located in the second cylinder 24 about the piston rod 30 tends to urge the second piston 26 in a direction toward its fully retracted position.

One end of second cylinder 24 is placed in communication with and operatively connected to the oil pump by a conduit 31. As is best seen in FIG. 2, the conduit 31 is connected into the oil pump line 15 by a T-shaped fitting 32.

The outermost end of second piston rod 30 carries a cam plate 33 at one side and a latch member 34 at the opposite side. As will appear upon later description, the second piston rod 30 can be retained in its extended position despite minor, yet varying changes in oil pressure in the second cylinder 24. Mounted on the panel 13 is a leaf spring 35 having a shoulder 36 over which the latch member 34 rides during extension and retraction of the piston rod 30. Upon full extension of the second piston rod 30, the locking shoulder 36 will snap over the latching member 34 to hold it in place.

A solenoid 37 is operatively connected to the leaf spring 35 and tends to urge the leaf spring 35 upwardly to cause the operative engagement of shoulder 36 and latch member 34. When the oil pressure from the oil pump is relieved, the solenoid 37 is simultaneously deenergized so that the compressive force of spring 27 causes the latching member 34 to override the shoulder 36 and causes the second piston 26 to move to its fully retracted position.

Figure 6:
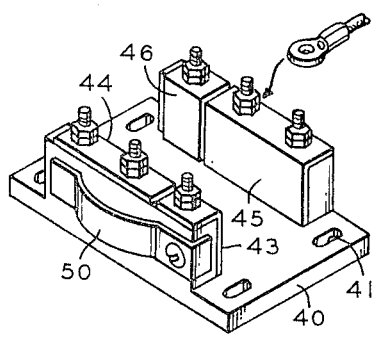
FIG. 6 is a perspective view of the main switch.

The main switch means that cooperates with the pressure-responsive means is perhaps best shown in FIGS. 3 and 6. It is seen that the main switch means includes a base 40 having a plurality of slots 41 through which pins 42 are slidably received and extended. The pins 42 mount the base 40 to the panels 13 for reciprocative movement in a direction transversely to the reciprocative axes of the first and second piston 11 and 26.

Fixed to one side of the base 40 is a contact 43 insulatively separated from and yet closely adjacent to a relatively longer contact 44. At the opposite side of base 40, there is fixed a contact 45 that is insulatively separate from yet closely adjacent to a relatively shorter contact 46. The coacting contacts 43 and 44 at one side are spaced from the cooperating contacts 46 and 47 at the opposite side of the main switch. The first piston contact 23 moves reciprocatively in a predetermined path between these cooperating pairs of contacts.

The main switch is movable to a first position as is shown in FIG. 3 in which the first piston contact 23 will engage the contacts 43 and 44 at one side during reciprocation of the first piston 11 in response to variation in oil pump pressure. The first piston contact 23 will thereby engage the contact 43 up to a predetermined vehicle speed as is determined by the length of the contact 43 and the amount of piston extension. Above this predetermined vehicle speed, the first piston contact 23 will engage the relatively longer contact 44. When the main switch is moved to its second position as is best shown in FIG. 2, the first piston contact 23 will initially engage the contact 46 at the opposite side of the base 40, assuming that the vehicle speed is above another predetermined value. After the vehicle slows below this last predetermined speed, the first piston contact 23 will subsequently engage the relatively longer contact 45 until the piston 11 is fully retracted and the vehicle is consequently stopped.

A leaf spring 47 has one end fixed relative to the panel 13 and the other end engaging one side of the main switch, the spring 47 tending to urge the main switch toward the first position as is illustrated in FIG. 2 so that the piston contact 23 will operatively engage the contact 45 and contact 46 upon reciprocative action of the piston 11 and hence of the piston contact 23.

Attached to the other side of the main switch is a curved cam follower 50 that is adapted to engage the reciprocative cam plate 33. When the second piston 26 is extended under oil pressure, the cam plate 33 moves outwardly to an extended position and engages the cam follower 50 to urge the main switch in a direction toward the second position as is illustrated in FIG. 3 so that the first piston contact 23 will engage contact 43 and contact 44 upon reciprocative action of the first piston 11 and hence of the first piston contact 23.

The conditioning switch for adapting the automotive safety unit for either normal automotive use or for safety use as will be explained, includes a pivoted switch arm 51, movable to one position as is shown in FIG. 2 to engage a contact 52 and selectively movable to another position as illustrated in FIG. 3 to engage a contact 53. When moved to engage the contact 52 as shown in FIG. 2, the switch arm 51 conditions the mechanism for normal automotive use and interconnects a red bulb 54 in the ignition circuit to indicate that the safety system is not being utilized. When the switch arm 51 engages the contact 53 as shown in FIG. 3, a green bulb 55 is connected in the ignition circuit to indicate that the automotive safety system is being utilized.

Figure 10:
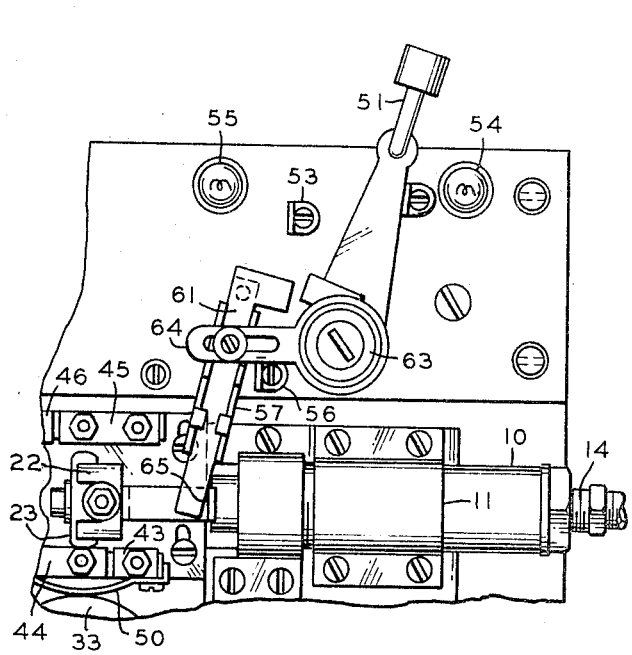
FIG. 10 is a fragmentary front elevational view of the pressure-responsive means illustrating the operation of the ignition cut-off switch.

An ignition cut-off mechanism includes a fixed contact 56 and a swingable contact 57. The contact 57 consists of a slide channel adapted to receive an arm 61 selectively movable to a retractive position as shown in FIG. 2 and to an extended position as shown in FIG. 10. A spring 62 is operatively connected to the movable contact 57 and tends to urge the movable contact 57 against the fixed contact 56. A key-operated member 63 is operatively connected to the arm 61 by a pin 60 and slot 64. When a suitable key is inserted into member 63 and turned, the slidable arm 61 can be selectively retracted or extended.

Cooperating with this key-operated mechanism, is a stop element 65 attached and carried by the first piston head 22. In the fully retracted position of the first piston 11, the stop element 65 is located behind the arm 61. When a suitable key is inserted into the key-operated mechanism 63, and turned, the slidable arm 61 will be extended into the path of movement of the piston stop element 65. As will appear upon later description, when the speed of the vehicle reaches a predetermined value the first piston 11 will be extended by the oil pressure to a point where the stop element 65 engages the arm 61 and swings the contact 57 away from the fixed contact 56 in order to open the ignition system and stop the motor. When the oil pressure is relieved upon stoppage of the motor, the first piston 11 returns to its retracted position and moves the piston stop element 65 rearwardly out of effective engagement with the arm 61. The spring 62 returns the contact 57 automatically against the fixed contact 56 to recondition this automatic ignition cut-off mechanism.

Figure 1:
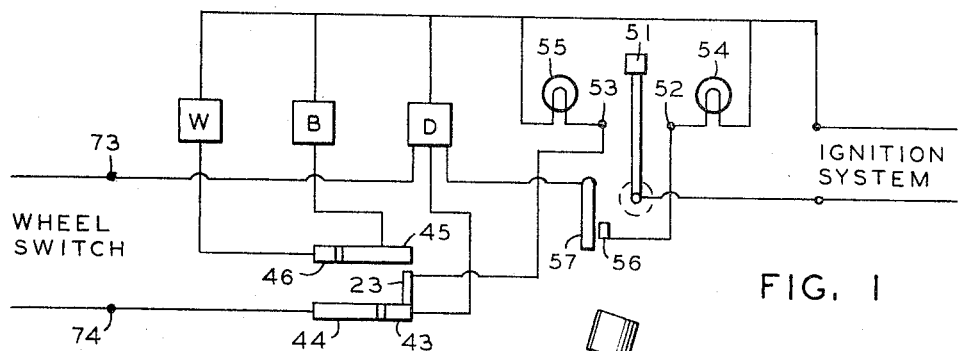
FIG. 1 is a diagrammatic view of the automotive safety system.

Referring to FIG. 1 and the electrical circuit diagram, it will be understood that the distributor D is operatively connected to the contact 43 of the main switch and is connected to a wheel switch constituting a manually operable switch which will be subsequently described. A brake-actuating means B is operatively connected to the contact 45 of the main switch. A warning means W consisting of any one or more of lights, buzzers and horns is operatively connected to the contact 46. The first piston contact 23 is operatively connected to the conditioning switch contact 53.

Figure 7:
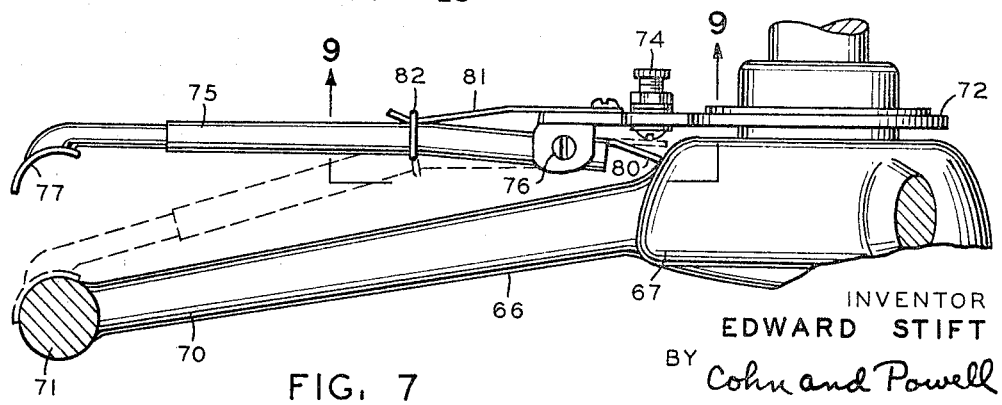
FIG. 7 is a fragmentary top plan view of the steering wheel and the manual switch associated therewith.

The manual switch is shown in FIGS. 7–9 inclusive and includes a steering wheel generally indicated at 66 having the usual hub 67, radially extending spokes 70 and a peripheral rim 71. Swivelly mounted on and relative to the steering wheel hub 67 is a plate 72 that carries a pair of switch contacts 73 and 74. It is these contacts 73 and 74 that are operatively connected respectively to the distributor D and to the main switch contact 44 as is illustrated in FIG. 1.

A switch arm 75 is pivotally mounted to swivel plate 72 by pin 76. The outermost end of switch arm 75 is provided with a transverse grip portion 77 curved to conform to the configuration of the steering wheel rim 71. The innermost end 80 of the switch arm 75 is flattened and serves to bridge and operatively close the switch contacts 73 and 74 when the switch arm 75 is gripped and pivotally moved so that the grip portion 77 slidable engages the wheel rim 71.

A leaf spring 81 is fixed at one end to the swivel plate 72 and is fixed at the opposite end by a retaining band 82 to the switch arm 75, the spring 81 tending to move the switch arm 75 in a direction so that the grip portion 77 moves away from the wheel rim 71 and so that the arm end 80 moves away from the switch contacts 73 and 74 and thereby opens the wheel switch circuit.

To utilize the vehicle without the automotive safety features, the conditioning switch arm 51 is moved to engage the contact 52 as is shown in FIG. 2. It is seen that the distributor is operatively connected in the ignition system through the switch contacts 56 and 57, and that the indicating red bulb 54 is lighted to show that the safety units are not operating. Under these conditions, as the vehicle accelerates, decelerates or cruises, the first piston 11 and hence the piston head 22 will reciprocate in accordance with the variations of oil pressures from the oil pump, but will accomplish nothing in the circuit because the piston contact 23 is not operatively connected in the ignition system. The steering wheel 66 is used in the conventional manner to steer the vehicle. The manual switch arm 75 need not be held closed, or need not be touched at all, because the wheel switch contacts 73 and 74 are not operatively connected in the ignition system.

If it is desired to place the vehicle under safety operation, the conditioning switch 51 is simply moved in a direction to engage the contact 53. This action places the indicating green bulb 55 in the circuit to show that the automotive safety features are being utilized. Of course it will now be readily understood that the first piston contact 23 is operatively connected in the ignition system and coacts with the main switch to perform various functional results.

For example it will be first asumed that the vehicle is stopped and that the first piston 11 and the second piston 26 are fully retracted to the position shown in FIG. 2. When the motor is started, the second piston 26 will be extended immediately under oil pressure from the oil pump. The cam 33 engages the cam follower 50 to move the main switch in a direction to its first position as indicated in FIG. 3.

As the vehicle accelerates from a zero speed up to a speed of approximately thirty miles per hour the first piston contact 23 will move along the main switch contact 43. It will be noted that the main switch contact 43 is operatively connected in the ignition system through the distributor D. At this range of speed, the steering wheel manual switch need not be closed because it is believed that at these low speeds the vehicle can be safely stopped under almost any conditions.

As the vehicle accelerates above thirty miles per hour the first piston contact 23 will move along the main switch contact 44. Because the distributor D is connected to the main switch contact 44 through the steering wheel switch contacts 73 and 74, the driver must maintain the contacts 73 and 74 closed by swinging the switch arm 75 toward the wheel so that the grip portion 77 engages and slidably rides on the wheel rim 71. It will be understood that the steering wheel 66 can be easily turned in the conventional manner to steer the vehicle, and that the driver merely slides the grip portion 77 of the switch arm 75 along the wheel rim 71 while gripping both elements.

As the vehicle decelerates, the first piston switch 23 will be retracted in response to the variation in oil pressure in the first piston 11, the piston switch contact 23 moving rearwardly along the main switch contact 44 until the predetermined speed of thirty miles per hour is reached, at which time the piston contact 23 will move along the main switch contact 43. At this stage of operation, the driver can still maintain the wheel switch closed or release it to open such switch as the driver deems advisable. One of the important advantages is achieved in that the vehicle can be stopped with the motor running and the driver's hands are free to perform other functions such as opening and closing doors.

It will be assumed that at a relatively high rate of speed during which the piston contact 23 engages the main switch contact 44 and during which the steering wheel contacts 73 and 74 are closed by the switch arm 75, that the driver suffers a physical disability, such as a heart attack, which prevents the driver from holding the switch arm 75 in its operatively closed position. As the switch arm 75 is released, the spring 81 moves the switch arm 75 in a position so that the contacts 73 and 74 are opened. Immediately the distributor D is disconnected, causing the motor to stop. The solenoid 37 is deenergized to release the latch arm 34, and upon release of the oil pressure by the oil pump, the second piston 26 immediately retracts, causing a retraction of the cam plate 33. The spring 47 urges the main switch toward its first position as is illustrated in FIG. 2. However, the first piston 11 does not retract immediately as does the second piston 26 because of the check valve 14. The first piston 11 retracts very slowly upon release of the oil pressure.

Assuming a relatively high rate of speed when the wheel switch contacts 73 and 74 are opened, the first piston contact 23 will engage the main switch contact 46 that operatively actuates the warning means W. If the steering wheel switch has been unintentionally opened by release of the switch arm 75, this initial warning calls the driver's attention to the fact that the distributor D has been disconnected and that the motor must be restarted. However after only a short period of time, say approximately ten seconds or less, the first piston switch 23 will move against the main switch contact 45, thereby operatively connecting the brake-actuating means B to halt the vehicle. The first piston 11 will retract under its spring loading as the piston contact 23 engages the main switch contact 45. It is seen that the vehicle will be effectively halted. When fully retracted, the piston contact 23 disengages the main switch contact 45 as is shown in FIG. 2, thereby disconnecting from the electrical circuit.

An additional safety unit is provided by the ignition cut-off mechanism in that the vehicle can be conditioned not to exceed a predetermined speed limit of say approximately twenty miles per hour. This feature is of importance when the vehicle is parked. It allows a parking attendant to operate the vehicle with sufficient speed to reposition it, but prevents any one from driving the vehicle above the predetermined speed. Importantly, this mechanism would preclude or at least discourage a thief from stealing the vehicle.

The driver merely inserts a suitable key into the key-operated member 63 and rotates such member in a direction to push the arm 61 outwardly into the path of the stop element 65. When the key is withdrawn, the slidable arm 61 cannot be accidentally or intentionally withdrawn.

When the vehicle motor is started and the vehicle accelerates, the first piston 11 will move outwardly in the manner previously described. As the piston head 22 is extended, the stop element 65 moves outwardly therewith. When the vehicle exceeds a predetermined speed, the stop element 65 engages the arm 61, and hence pivots the contact 57 away from its coacting contact 56 in order to disconnect the distributor D. The motor is now stopped and must be restarted. Thus it is seen that the vehicle can never exceed such predetermined speed under these operating conditions.

Of course, the driver upon inserting the suitable ignition key can actuate the key-operated member 63 to withdraw the slidable arm 61 out of the path of the stop element 65 in order to obtain normal operation.

Although the invention has been described by making detailed reference to a single preferred embodiment, such detail is to be understood in an instructive, rather than in any restrictive sense, many variants being possible within the scope of the claims hereunto appended.

I claim as my invention:

1. In an automotive safety unit for a system including a distributor, brake-actuating means and oil pump:
   (a) an electrical circuit having switching means including a first contact operatively connected to the distributor, and having a second contact operatively connected to the brake-actuating means,
   (b) a pressure-responsive means connected to the oil pump including a movable contact in the said electrical circuit,
   (c) means selectively engaging said movable contact with said first contact,
   (d) a manual switch interconnecting said first contact and distributor, and
   (e) means selectively engaging said movable contact with said second contact to actuate said brake-actuating means when the distributor is disconnected upon opening of the manual switch.

2. In an automotive safety unit for a system including a distributor, brake-actuating means and oil pump:
   (a) an electrical circuit having a main switch movable to a first and a second position, said main switch having a first contact operatively connected to the distributor, and having a second contact operatively connected to the brake-actuating means,
   (b) a pressure responsive means connected to the oil pump including a movable contact in the said electrical circuit,
   (c) means selectively moving said main switch to one position to engage said movable contact with said first contact, and
   (d) a manual switch selectively causing the main switch to move to the second position to engage said movable contact with said second contact to actuate said brake-actuating means when the distributor is disconnected upon opening of the manual switch.

3. In an automotive safety unit for a system including a distributor, a brake-actuating means and the oil pump:
   (a) an electrical circuit having a main switch, said main switch including a first contact at one side operatively connected to the distributor, a second contact on the same side, and a third contact on the opposite side operatively connected to the brake-actuating means,
   (b) a manual switch interconnecting the second contact and distributor,
   (c) a pressure-responsive means operatively interconnected to the oil pump and including a movable contact in the circuit and disposed between the first and second contacts at one side and the third contact at the other side,
   (d) said movable contact moving back and forth between and engaging said first and second contacts in response to variations in oil pump pressure, and
   (e) means selectively engaging said movable switch with said third contact to actuate the brake-actuating means when the distributor is disconnected upon opening of said manual switch as the movable contact engages the second contact.

4. In an automotive safety unit for a system including a distributor, brake-actuating means and oil pump:
   (a) an electrical circuit having a main switch movable to a first position and to a second position, said main switch including a first contact at one side operatively connected to the distributor, a second contact on the same side, and a third contact on the opposite side operatively connected to the brake-actuating means,
   (b) a manual switch interconnecting the said second contact and distributor,
   (c) a pressure-responsive means operatively connected to the oil pump and including a reciprocative contact in the circuit disposed between the first and second contacts at one side and the third contact at the other side,
   (d) said movable contact reciprocating and selectively engaging said first and second contacts in response to variations in oil pump pressure when the main switch is disposed in said first position, and
   (e) means selectively moving said main switch to the second position to engage said movable contact with said third contact to actuate the brake-actuating means when the distributor is disconnected upon opening of said manual switch as the movable contact engages the second contact.

5. In an automotive safety unit for a system including a distributor, brake-actuating means and oil pump:
   (a) an electrical circuit having main switch means, said switch means including a contact at one side operatively connected to the distributor, a second contact on the same side, and a third contact on the opposite side operatively connected to the brake-actuating means,
   (b) a manual switch interconnecting the said second contact and distributor,
   (c) a pressure-responsive means operatively connected to the oil pump including a first cylinder and piston,
   (d) a contact carried by said piston and connected in said circuit, said piston contact being disposed between the first and second contacts at one side and the third contact at the other side, the piston contact reciprocating and selectively engaging said first and second contacts in response to variation in oil pump pressure in said cylinder,
   (e) means retarding flow from said cylinder to slow movement of the piston contact in one direction, and
   (f) a second cylinder and piston connected to said oil pump, said second piston urging the first piston contact into engagement with said first and second contacts in response to oil pressure and selectively causing engagement of the first piston contact with the third contact to actuate the brake-actuating means when the distributor is disconnected and oil pressure is relieved upon opening of said manual switch as the piston contact engages the second contact.

6. In an automotive safety unit for a system including a distributor, brake-actuating means and oil pump:
   (a) an electrical circuit having a main switch movable to a first position and to a second position, said main switch including a first contact at one side operatively connected to the distributor, a second contact on the same side, and a third contact on the opposite side selectively connected to the brake-actuating means,
   (b) a manual switch interconnecting the said second contact and distributor,
   (c) a pressure-responsive means operatively connected to the oil pump including a first cylinder and piston,
   (d) a contact carried by said piston and connected in said circuit, said piston contact being disposed between said first and second contacts at one side and the third contact at the other side, the piston contact reciprocating between and selectively engaging said first and second contacts in response to variation in oil pump pressure in said cylinder when the main switch is disposed in said first position,
   (e) means retarding flow from said cylinder to slow movement of the piston contact in one direction, and
   (f) a second cylinder and piston connected to said oil pump, said second piston urging the main switch to the said first position so that the first piston contact engages the first and second contacts in response to variation in oil pressure, and said second piston causing the main switch to move to the second position to move the first piston contact selectively into engagement with the third contact to actuate the brake-actuating means when the distributor is disconnected and oil pressure is relieved upon opening of said manual switch as the piston contact engages the second contact.

7. The combination and arrangement of elements as recited above in claim 6, but further characterized by the provision of means holding the second piston extended to maintain said main switch means in said first position and to maintain operative engagement of the first piston contact with the first and second contacts despite minor fluctuations of oil pressure in said second cylinder.

8. In an automotive safety unit for a system including a distributor, brake-actuating means and oil pump:
  (a) an electrical circuit having a main switch, said main switch including a first contact at one side operatively connected to the distributor, a second contact on the same side, and a third contact on the opposite side operatively connected to the brake-actuating means,
  (b) a manual switch interconnecting the said second contact and distributor,
  (c) a pressure-responsive means operatively connected to the oil pump including a first cylinder and piston movable from a retracted to an extended position,
  (d) a contact carried by said piston and connected in said circuit, said piston contact being disposed between the first and second contacts at one side and the third contact at the other side,
  (e) the piston contact reciprocating between and selectively engaging said first and second contacts in response to variations in oil pump pressure in said cylinder corresponding to automotive speeds, said first piston contact engaging said first contact upon initial extension of the piston, the first contact being of a length to engage said piston contact up to a predetermined speed, said second contact being of a length to engage said piston contact above such predetermined speed,
  (f) a second cylinder and piston connected to said oil pump, said second piston urging the first piston contact into engagement with the first and second contacts in response to oil pressure and selectively causing engagement of the first piston contact with the third contact to actuate the brake-actuating means when the distributor is disconnected and oil pressure is relieved upon opening of said manual switch as the piston contact engages the second contact, and
  (g) the third contact overlapping said first and second contacts and being of a length to engage the piston contact down to zero speed as said first piston moves to the retracted position.

9. In an automotive safety unit for a system including a distributor, brake-actuating means, warning means and oil pump:
  (a) an electrical circuit having a main switch, said main switch including a first contact at one side operatively connected to the distributor, a second contact on the same side, a third contact on the opposite side operatively connected to the brake-actuating means, and a fourth contact operatively connected to said warning means,
  (b) a manual switch interconnecting the said second contact and distributor,
  (c) a pressure-responsive means operatively connected to the oil pump and including a movable contact in the circuit and disposed between the first and second contacts at one side and the third and fourth contacts at the other side, said movable contact reciprocating between and engaging said first and second contacts in response to variations in oil pump pressure corresponding to automotive speed, and
  (d) means selectively engaging said movable contact with said fourth contact to actuate the warning means when the distributor is disconnected upon opening of said manual switch as the movable contact engages the second contact above a predetermined speed, and subsequently engaging the movable contact with the third contact to actuate the brake-actuating means.

10. In an automotive safety unit for a system including a distributor, brake-actuating means, warning means and oil pump:
  (a) an electrical circuit having a main switch, said main switch including a first contact at one side operatively connected to the distributor, a second contact on the same side, a third contact on the opposite side operatively connected to the brake-actuating means, and a fourth contact on the same said opposite side operatively connected to the warning means,
  (b) a manual switch interconnecting the said second contact and distributor,
  (c) a pressure-responsive means operatively connected to the oil pump including a first cylinder and piston,
  (d) a contact carried by said piston and connected in said circuit, said piston contact being disposed between the first and second contacts at one side and the third and fourth contacts at the opposite side,
  (e) the piston contact reciprocating between and selectively engaging said first and second contacts in response to variations in oil pump pressure in said cylinder corresponding to automotive speeds, and
  (f) a second cylinder and piston connected to said oil pump, said second piston urging the first piston contact to engagement with the first and second contacts in response to variations in oil pressure and selectively causing engagement of the first piston contact with the fourth and third contacts to actuate the warning means and the brake-actuating means when the distributor is disconnected and oil pressure is relieved upon opening of said manual switch as the piston contact engages the said second contact.

11. In an automotive safety system including a distributor, brake-actuating means, warning means and oil pump:
  (a) an electrical circuit having a main switch movable to a first and a second position, said main switch including a first contact at one side operatively connected to the distributor, a second contact on the same one side, a third contact on the opposite side operatively connected to the brake-actuating means, a fourth contact on the same opposite side operatively connected to said warning means,
  (b) a manual switch interconnecting the said second contact and distributor,
  (c) a pressure-responsive means operatively connected to the oil pump including a first cylinder and piston,
  (d) a contact carried by said piston and connected in said circuit, said piston contact being disposed between the first and second contacts on one side and third and fourth contacts on the opposite side of said main switch,
  (e) the piston contact reciprocating between and selectively engaging said first and second contact in response to variation in oil pump pressure in said cylinder corresponding to automotive speeds when said main switch is disposed in said first position,
  (f) a second cylinder and piston connected to said oil pump, said second piston urging the main switch into said second position in which the first piston contact selectively engages the fourth contact to actuate the warning means above a predetermined speed when the distributor is disconnected and the oil pressure is relieved upon opening of said manual switch as the piston contact engages the second contact, and selectively engaging the third contact to actuate the brake-actuating means upon retraction of said first piston.

12. The combination of elements as recited above in claim 11, but further characterized in that:

(a) the first piston is movable from a retracted to an extended position, (b) the first contact is of a length to engage the piston contact up to a predetermined speed upon initial extension of said first piston and said second contact being of a length to engage the piston contact above said predetermined speed while the main switch is located in said first position, and (c) the fourth contact is of a length to engage the piston contact when the main switch is in said second position down to a predetermined speed as the first piston retracts and said third contact is of a length to engage the piston contact after disengagement with the fourth contact and until complete retraction of said first piston.

References Cited by the Examiner
UNITED STATES PATENTS

| | | | |
|---|---|---|---|
| 1,707,241 | 4/1929 | Wagner | 303—21 X |
| 1,891,668 | 12/1932 | Cook | 303—21 X |
| 2,162,174 | 6/1939 | Jones | 123—146.5 |
| 2,191,216 | 2/1940 | Mendez | 123—146.5 |
| 2,337,838 | 12/1943 | Reavis | 123—198 |
| 2,347,297 | 4/1944 | Stellingwerf | 200—83 |
| 2,358,729 | 9/1944 | Murphy | 123—146.5 |
| 2,499,319 | 2/1950 | Lillquist | 123—198 X |
| 2,504,670 | 4/1950 | Everest | 123—198 X |
| 2,581,737 | 1/1952 | West | 307—10 X |
| 2,600,810 | 6/1952 | Lucas | 123—198 |
| 2,603,690 | 7/1952 | Moody | 123—198 X |
| 2,744,975 | 5/1956 | Naumann | 200—61.56 |
| 2,751,507 | 6/1956 | Crum | 307—10 |
| 2,793,301 | 6/1957 | Long | 307—10 |
| 2,872,539 | 2/1959 | Berner | 200—61.56 |
| 3,051,258 | 8/1962 | Byers | 303—19 X |
| 3,054,479 | 9/1962 | Allen | 188—152 |
| 3,116,729 | 1/1964 | Crowe | 123—198 X |
| 3,186,508 | 6/1965 | Lamont | 303—19 X |

ORIS L. RADER, *Primary Examiner.*

LLOYD McCOLLUM, *Examiner.*

L. R. CASSETT, T. J. MADDEN, *Assistant Examiners.*